(12) United States Patent
Cha et al.

(10) Patent No.: US 8,360,525 B2
(45) Date of Patent: Jan. 29, 2013

(54) RECLINING DEVICE OF SEAT FOR VEHICLE

(75) Inventors: Jaewon Cha, Ulsan (KR); Junsik Hwang, Gyeongbuk (KR)

(73) Assignee: DAS Corporation, Gyeongsangbuk-do (KR)

( * ) Notice: Subject to any disclaimer, the term of this patent is extended or adjusted under 35 U.S.C. 154(b) by 369 days.

(21) Appl. No.: 12/669,900

(22) PCT Filed: Feb. 14, 2008

(86) PCT No.: PCT/KR2008/000873
§ 371 (c)(1),
(2), (4) Date: Jan. 20, 2010

(87) PCT Pub. No.: WO2009/022776
PCT Pub. Date: Feb. 19, 2009

(65) Prior Publication Data
US 2010/0194163 A1  Aug. 5, 2010

(30) Foreign Application Priority Data

Aug. 16, 2007 (KR) ........................ 10-2007-0082183

(51) Int. Cl.
*B60N 2/22* (2006.01)
(52) U.S. Cl. ...................................................... 297/362
(58) Field of Classification Search .................. 297/362, 297/367 R
See application file for complete search history.

(56) References Cited

U.S. PATENT DOCUMENTS

| 5,634,689 | A  | * | 6/1997  | Putsch et al. ................... 297/362 |
| 7,090,298 | B2 | * | 8/2006  | Lange ............................ 297/362 |
| 7,314,250 | B1 | * | 1/2008  | Eblenkamp et al. ........... 297/362 |
| 7,461,900 | B2 | * | 12/2008 | Lange ........................ 297/367 R |
| 7,513,573 | B2 | * | 4/2009  | Wahls et al. ................... 297/362 |
| 7,648,203 | B2 | * | 1/2010  | Voss et al. ..................... 297/362 |
| 2008/0001458 | A1 | * | 1/2008 | Hoshihara et al. ............ 297/362 |

FOREIGN PATENT DOCUMENTS

| KR | 10-2004-0091220 | 10/2004 |
| KR | 10-2004-0091805 | 11/2004 |
| KR | 10-2005-0050807 | 6/2005 |

* cited by examiner

*Primary Examiner* — Peter R. Brown
(74) *Attorney, Agent, or Firm* — Dickstein Shapiro LLP

(57) ABSTRACT

The present invention relates to a reclining device of a seat for a vehicle, which makes it possible to prevent backlash between an external gear 12 and an internal gear 22 in stop, resulting in preventing a vibration noise due to movement of the seatback. Further, it is possible to obtain sufficient power from even a small-output motor in operation, by minimizing the gear press angle to increase the operational efficiency. In addition, it is possible to design a compact reclining device by simplifying the shape and reduce the size of assemblies of wedge blocks 70, 120 and cams 80, 110, resulting in reducing the weight and the manufacturing cost and making it possible to freely designing the reclining device, depending on a disposing space.

5 Claims, 11 Drawing Sheets

RECLINING DEVICE OF SEAT FOR VEHICLE

TECHNICAL FIELD

The present invention relates to a reclining device that adjusts the angle of the seatback of a seat equipped in a vehicle.

BACKGROUND ART

In general, a seat in a vehicle is largely composed of a seatback supporting the passenger's back and a seat cushion supporting the part of the passenger from the hip to the thigh, in which the angle of the seatback can be adjusted by the reclining device.

Further, the reclining device includes left and right recliners each disposed to the left and right sides of the seat and a connecting shaft of which both ends are connected with the left and right recliners by splines to connect the left and right recliners.

The connecting shaft can be rotated by a driving force transmitted from an electric motor (not shown).

On the other hand, it is preferable to minimize the size and thickness of the reclining device in consideration of the seat because the reclining device is disposed the connecting portion of the seatback and the seat cushion.

However, decreasing the size of the reclining device decreases the engagement strength between geared parts and backlash is caused in stopping the reclining device, such that the seatback rocks back and forth or, if excessive, the reclining of the seatback unexpectedly operates, which threatens the passenger's safe. Accordingly, researches to prevent these problems are being made in recent years.

DISCLOSURE OF INVENTION

Technical Problem

It is an object of the invention to provide a reclining device that is compact in size and has an engagement strength that does not cause backlash, in order to reduce a disposing space, the weight, and the manufacturing cost of the reclining device while improving productivity.

Technical Solution

In order to accomplish the object of the invention, a reclining device according to the invention includes: a socket block that has a socket protrusion that is fitted on a shaft, which passes through the socket protrusion, and is inserted in a ring-shaped center protrusion of an internal gear bracket through a center hole of an external gear bracket, and an operating protrusion that covers a portion of the outer circumference of the ring-shaped center protrusion; a bearing that is inserted in the center hole of the external gear bracket; and a power transmission unit that is in close contact to the bearing while covering the other portion of the ring-shaped center protrusion, which is not covered by the operating protrusion, and rotates along the ring-shaped center protrusion by contact with the operating protrusion when the shaft rotates such that the external gear bracket rotates with respect to the internal gear bracket.

Advantageous Effects

According to a reclining device of the invention, it is possible to prevent backlash between an external gear and an internal gear in stop, resulting in preventing a vibration noise due to movement of the seatback. Further, it is possible to obtain sufficient power from even a small-output motor in operation, by minimizing the gear press angle to increase the operational efficiency. In addition, it is possible to design a compact reclining device by simplifying the shape and reduce the size of assemblies of wedge blocks and cams resulting in reducing the weight and the manufacturing cost and making it possible to freely designing the reclining device, depending on a disposing space.

MODE FOR THE INVENTION

The present invention is described in detail with reference to accompanying drawings.

Figure 1:
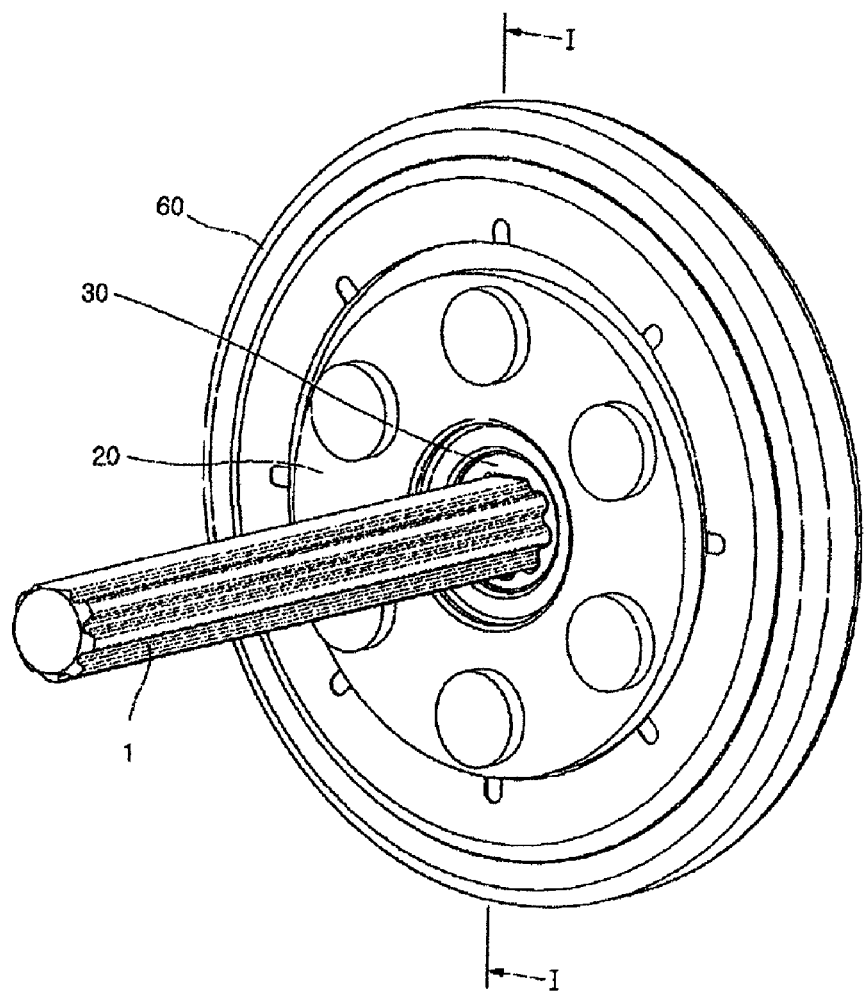
FIGS. 1 and 2 are a perspective view and an exploded perspective view illustrating a reclining device that has been assembled according to the invention.
Figure 2:
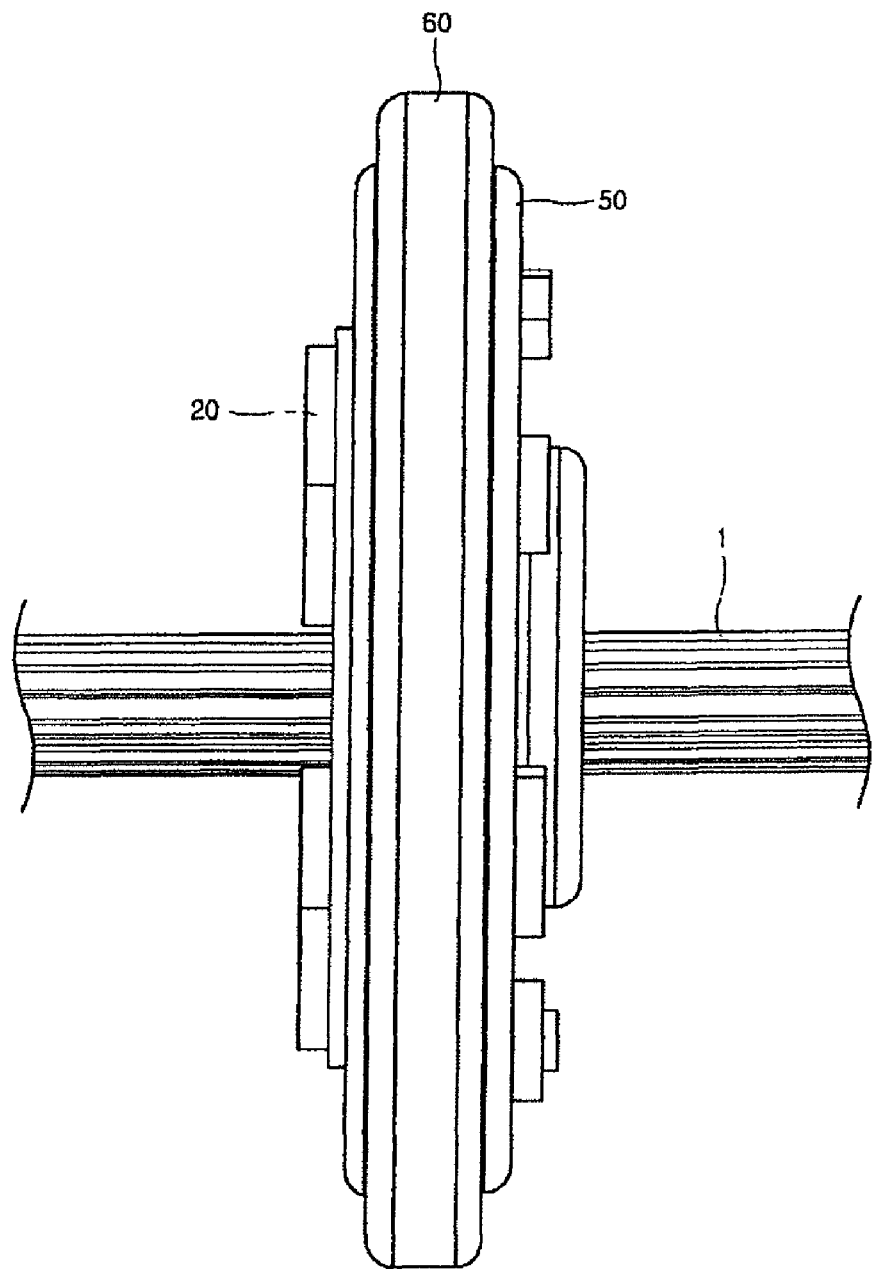
Figure 3:
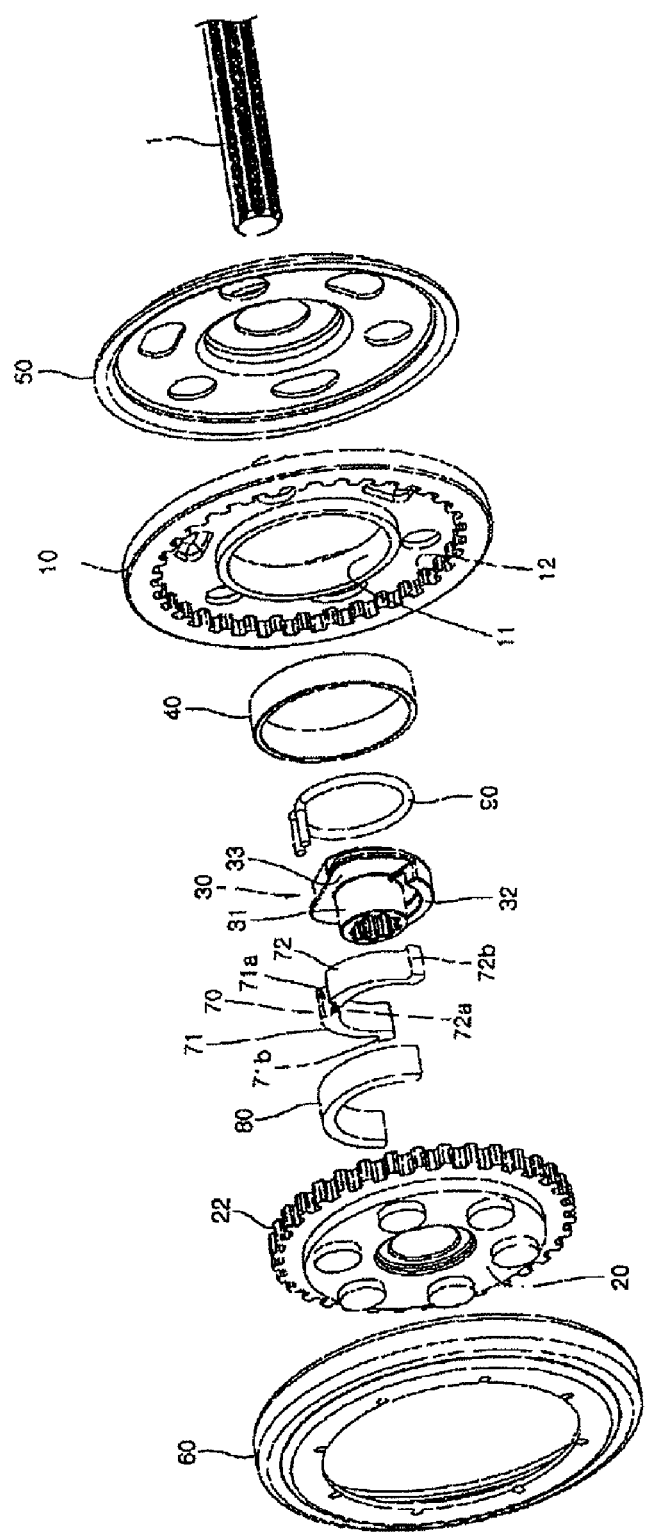
FIGS. 3 and 4 are exploded views of FIG. 1
Figure 4:
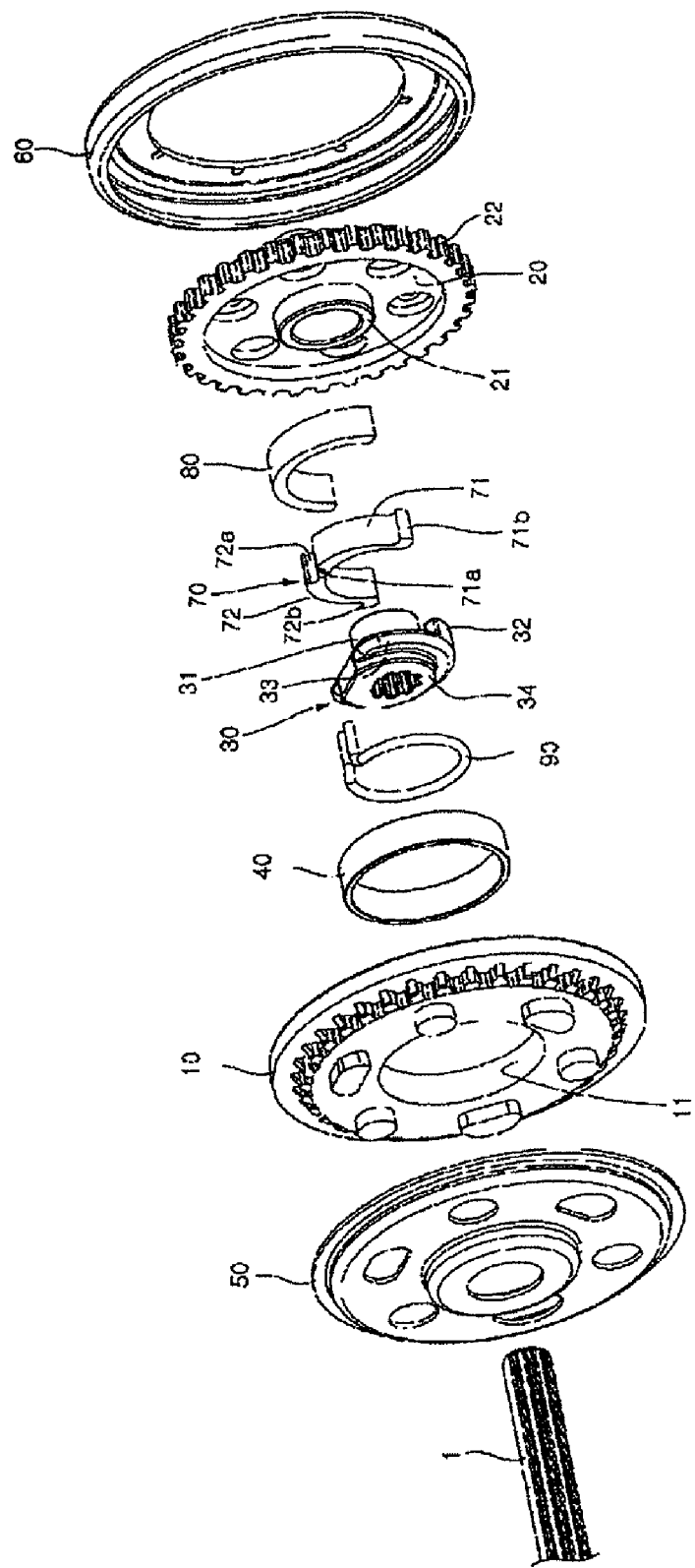
Figure 5:
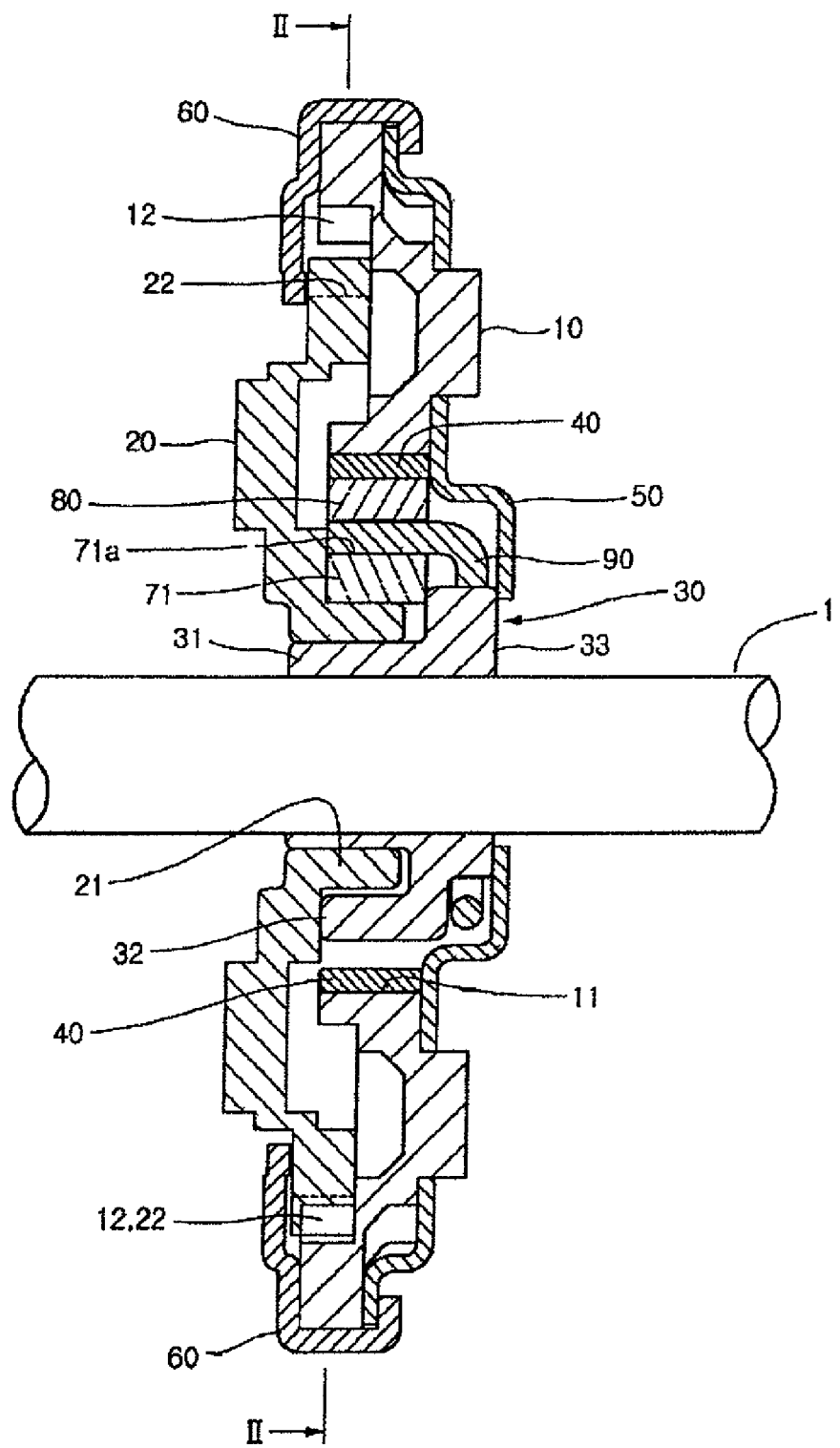
FIG. 5 is a cross-sectional view taken along the line I-I of FIG. 1.

FIGS. 1 and 2 are a perspective view and an exploded perspective view illustrating a reclining device that has been assembled according to the invention.

A reclining device equipped with a power transmission unit according to a first embodiment is first described with reference to FIGS. 1 to 7.

As shown in the figures, the reclining according to the invention largely includes a shaft 1, an external gear bracket 10, an internal gear bracket 20, a socket block 30, a bearing 40, a power transmission unit, a cover plate 50, and a guide bracket 60.

The external gear bracket 10 is a ring-shaped member attached to the seatback frame by a fixing member and has a center hole 11 at the center portion and an internal gear-typed external gear 12 that has a plurality of gear teeth and continuously formed on a side in the circumferential direction.

The lower tooth bracket 20 is a ring-shaped member that is attached to the seat cushion frame that is connected with the seatback frame, by a fixing member, and has a ring-shaped center protrusion 21 protruding toward the external gear bracket 10 at the center portion and an external gear-typed internal gear 22 that is continuously formed on the outer circumference in the circumferential direction to be selectively engaged with the external gear 12. The number gear teeth of lower tooth 22 is smaller than that of the external gear 12.

The socket block 30 has a socket protrusion 31 that is fitted on the shaft 1, which passes through the socket protrusion 31, by a spline, and is inserted in the ring-shaped center protrusion 21 of the internal gear bracket 20 through the center hole 11 of the external gear bracket 10, an operating protrusion 32 that covers a portion of the outer circumference of the ring-shaped center protrusion 21 when the socket protrusion 31 is inserted in the ring-shaped center protrusion 21, a connecting plate 33 that connects the socket protrusion 31 with the operating protrusion 32 and where wedge springs 90, 130 (described later) are attached, and a spring protrusion 34 that protrudes from a side of the connecting plate 33 in the opposite direction to the socket protrusion 31 and fixes the wedge springs 90, 130 attached to the connecting plate 33.

The bearing 40, a metal bearing, is inserted in the center hole 11 of the external gear bracket 10.

The power transmission unit is in close contact to the bearing 40 while covering the other portion of the ring-shaped center protrusion 21, which is not covered by the operating protrusion 32, and rotates along the ring-shaped center protrusion 21 by the contact with the operating protrusion 32 when the shaft 1 rotates such that the external gear bracket 10 rotates with respect to the internal gear bracket 20.

The cover plate 50 prevents separation of the socket block 30, the cam 40, and the power transmission unit by covering the rear side of the external gear bracket 10.

The guide bracket 60 covers the outer circumferences of the internal gear bracket 20 and the cover plate 50, including the external gear bracket 10, to combine them.

Meanwhile, the power transmission unit includes a pair of wedge blocks 70 that covers the entire outer circumference of the ring-shaped center protrusion 21, together with the operating protrusion 32, while rotating along the ring-shaped center protrusion 21 by the power transmitted through the operating protrusion 32 when the shaft 1 rotates, a cam 80 that is disposed around the outer sides of the wedge blocks 70 while being in close contact with the bearing 40, and a wedge spring 90 that is attached to the socket block 30 and has both bending ends that each are fitted in the pair of wedge blocks 70 to apply a force that opens the wedge blocks 70 outside.

The pair of wedge block 70 is composed of a first wedge block 71 and a second wedge block 72 that each are formed in a quarter arc shape.

The first and second wedge blocks 71, 72 each are formed of a wedge shape of which the size decreases from the center to both ends and has an eccentricity.

The first and second wedge blocks 71, 72 have spring grooves 71a, 72a at the ends facing each other to fit the wedge spring 90 and protrusion contact portions 71b, 72b at the other ends which are bent outside to contact with the operating protrusion 32.

Further, the cam 80 is formed in an arc shape, a semicircular shape.

Figure 6:
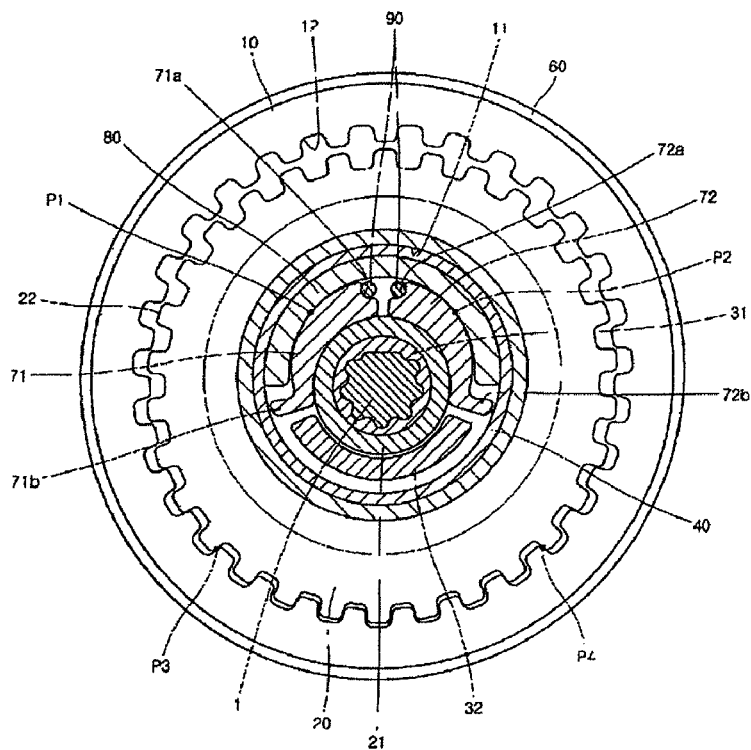
FIG. 6 is a cross-sectional view taken along the line II-II of FIG.5.

Therefore, a force that opens the first and second wedge blocks 71, 72 outside is exerted in the reclining device according to the invention by the force of the wedge spring 90 in stop, as shown in FIG. 6, such that the outer circumferences of the first and second wedge blocks 71, 72 are in contact with the inner side of the cam 80 (contact points P1, P2) and the internal gear 22 of the internal gear bracket 20 is strongly engaged with the external gear 12 of the external gear bracket 10 at two points (contact points P3, P4). Accordingly, it is possible to prevent backlash between the external gear 12 and the internal gear 22, resulting in preventing a vibration noise due to movement of the seatback.

Figure 7:
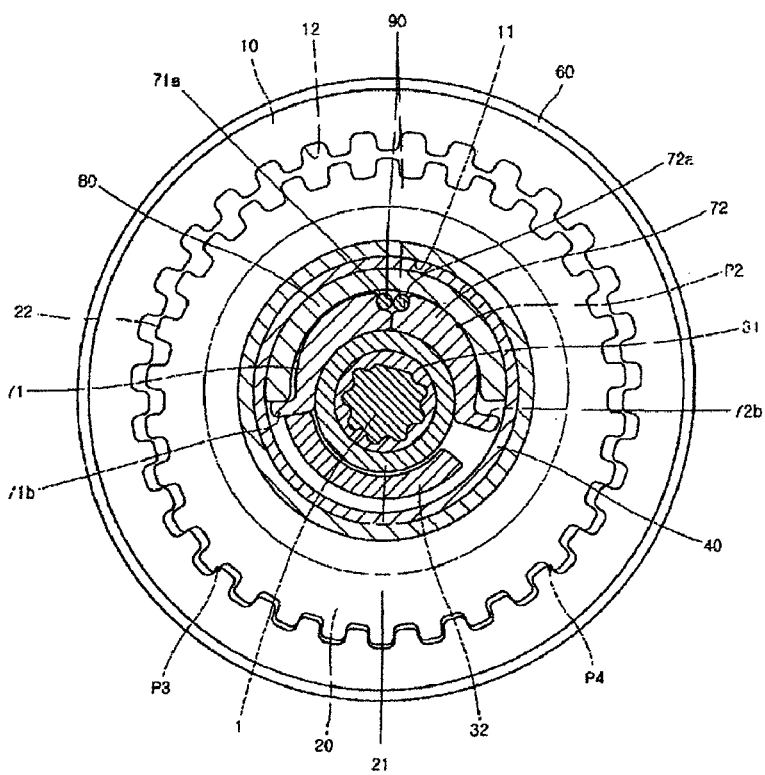
FIG. 7 is a view illustrating the operation of FIG. 6, in which the reclining device is equipped with a power transmission unit according to a first embodiment.
Figure 8:
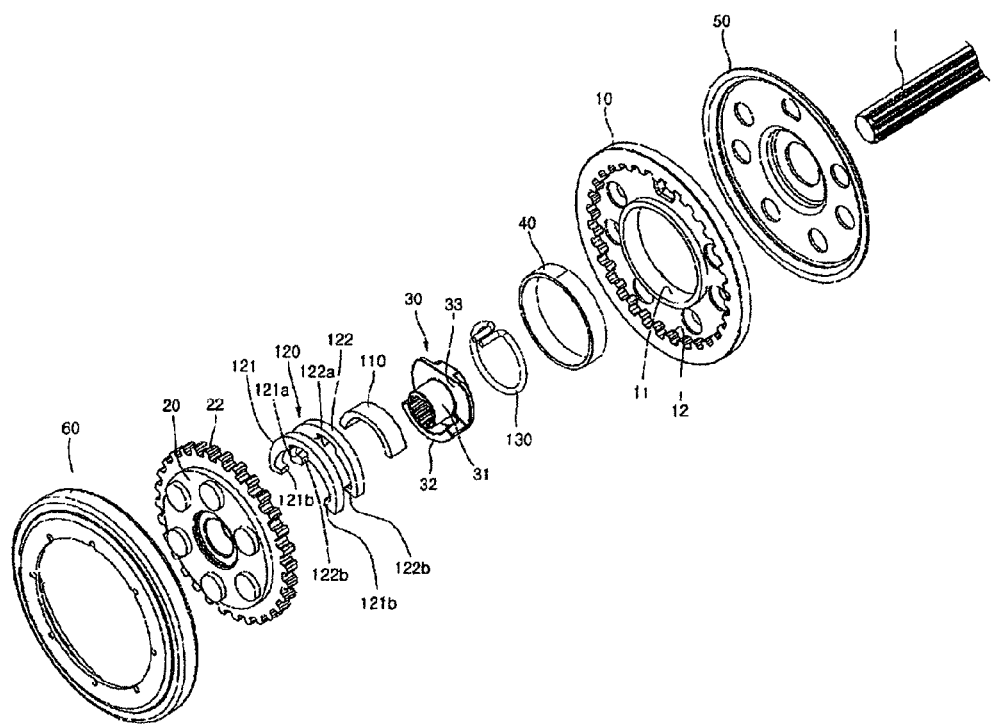
FIGS. 8 to 12 are views showing a reclining device equipped with a power transmission unit according to a second embodiment.
Figure 9:
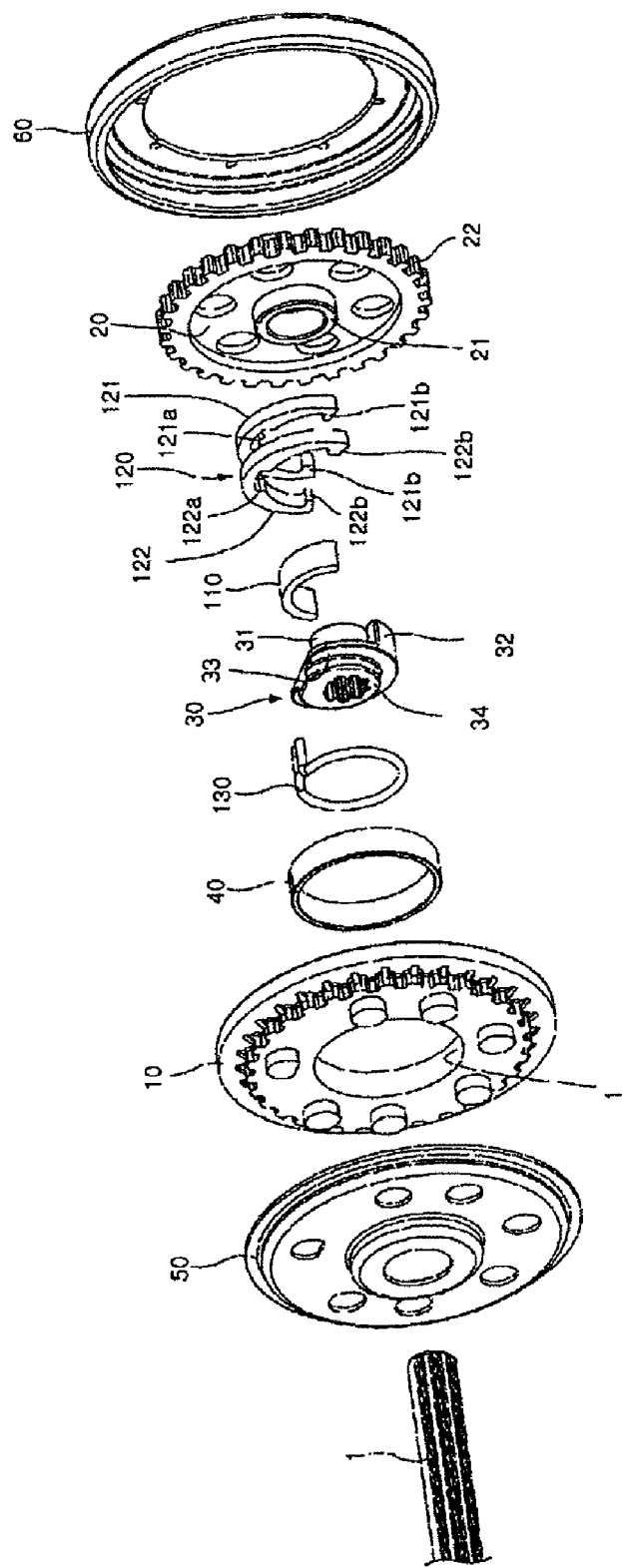
Figure 10:
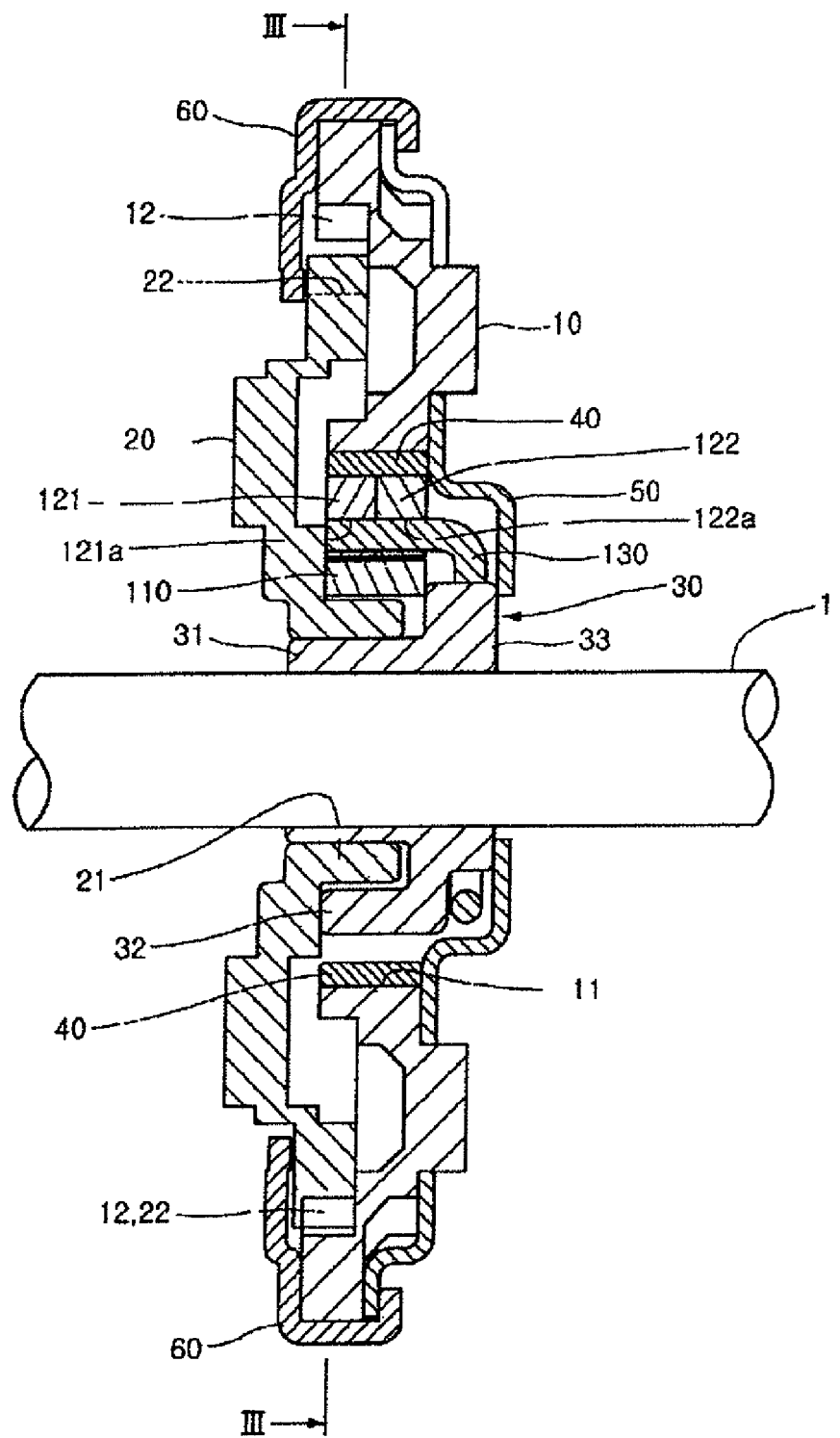

Further, as the shaft 1 rotate clockwise from the position shown in FIG. 6, the operating protrusion 32 of the socket block 30 pushes the first wedge block 71 to rotate clockwise, as shown in FIG. 7.

In this operation, a gap is defined between the first wedge block 71 and the cam 80 and the left end of the wedge spring 90 moves to the right end, while a force that moves the right end away of the wedge spring 90 from the left end is applied to the right end.

The second wedge block 72 and the cam 80 are rotated clockwise by the above force while the external gear bracket 10 rotates with respect to the internal gear bracket 20, in the rotational ratio as much as a difference in the number of teeth.

As the external gear bracket 10 rotates, the seatback rotates and the angle is adjusted.

A reclining device equipped with a power transmission unit according to a second embodiment of the invention is described with reference to FIGS. 8 to 12.

As shown in the figures, a reclining device according to the invention largely includes a shaft 1, an external gear bracket 10, an internal gear bracket 20, a socket block 30, a bearing 40, a power transmission unit, a cover plate 50, and a guide bracket 60.

The shaft 1, external gear bracket 10, internal gear bracket 20, socket block 30, bearing 40, cover plate 50, and guide bracket 60 have the same structures as those according to the first embodiment described in relation to FIGS. 1 to 7 and are not described in this embodiment.

The power transmission unit according to the second embodiment of the invention, as shown in the figures, includes a cam 110 that covers a portion of the outer circumference of a ring-shaped center protrusion 21 at the position opposite to an operating protrusion 32 through the shaft 1, a pair of wedge blocks 120 that is in close contact to the bearing 40 while covering the outer side of the cam 110, and rotates along the outer circumference of the cam 110 by power transmitted through the operating protrusion 32 when the shaft 1 rotates, and a wedge spring 130 that is attached to the socket block 30 and has both bending ends that each are fitted in the pair of wedge blocks 120 to apply a force that opens the wedge blocks 120 outside.

The pair of wedge blocks 120 is composed of a first wedge block 121 and a second wedge block 122 that each are formed into a semicircular arc shape and overlap each other.

The first and second wedge blocks 121, 122 each are formed in a wedge shape of which the size decreases from the center to both ends, and have an eccentricity.

Spring grooves 121a, 122a are formed at the center portions of the inner sides of the first and second wedge blocks 121, 122 to fit the wedge spring 130 and positioned to deviate from each other, and protrusion contact portions 121b, 122b are bent inside at both ends of the first and second wedge blocks 121, 122 to contact with the operating protrusion 32.

Further, the cam 110 is formed in an arc shape that is sized such that the cam can be inserted between the protrusion contact portions 121b, 122b.

Figure 11:
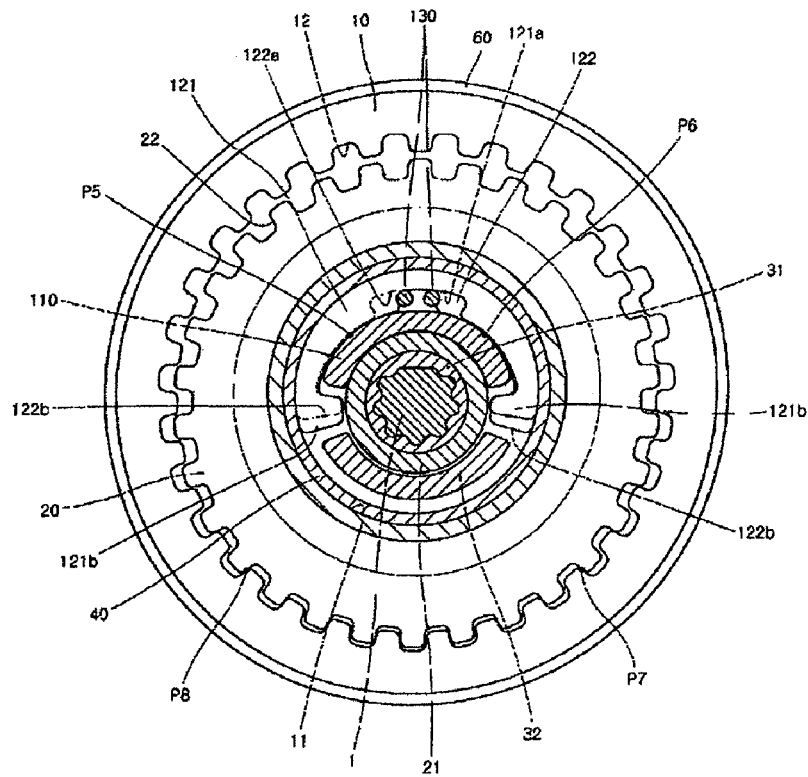
Figure 12:
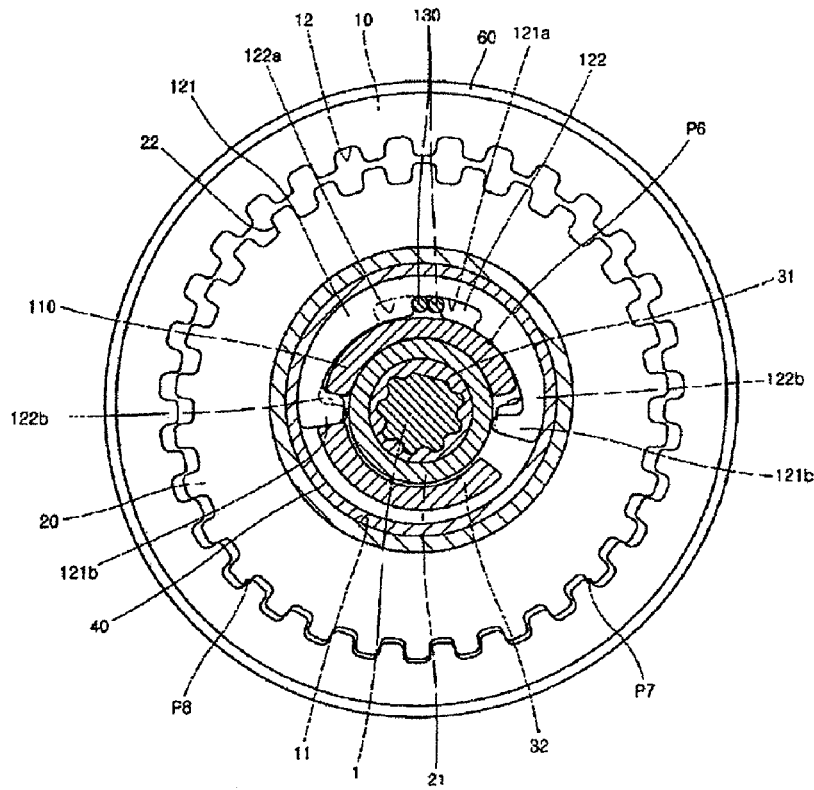

Therefore, a force that opens the first and second wedge blocks 121, 122 outside is also exerted in the reclining device according to the second embodiment of the invention by the force of the wedge spring 130 in stop as shown in FIG. 11, such that two points (contact points P5, P6) on the outer circumference of the cam 110 are in contact with the inner side of the wedge block 120 while the internal gear 22 of the internal gear bracket 20 is strongly engaged with the external gear 12 of the external gear bracket 10 at two points (contact points P7, P8). Accordingly, it is possible to prevent backlash between the external gear 12 and the internal gear 22, resulting in preventing a vibration noise due to movement of the seatback.

Further, assemblies of the wedge blocks 70, 120 and the cams 80, 110 in the parts of the power transmission unit of the reclining device according to the invention have relatively simple shapes, such that the invention has an advantage of improving productivity and facilitating quality control. In addition, because it is possible to reduce the size and thickness of the assemblies of the wedge blocks 70, 120 and the cams 80, 110, it is possible to design a compact reclining device.

Further, as it is possible to design a compact reclining device, it is possible to reduce the weight and the manufacturing cost while freely designing the reclining device, depending on a disposing space.

Figure 13:
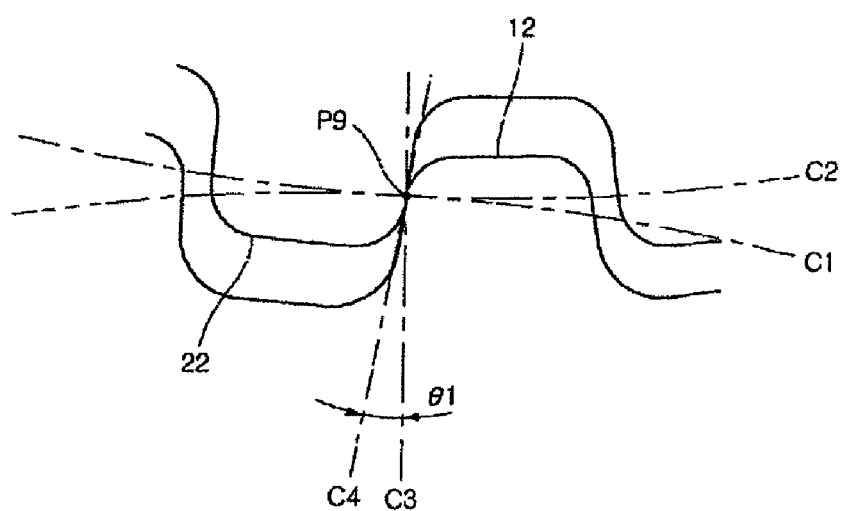
FIG. 13 is a view illustrating a press angle of an external gear and an internal gear according to the invention.

On the other hand, the reclining device according to the invention maintains a press angle θ1 of 5° to 10° between the external gear 12 of the external gear bracket 10 and the internal gear 22 of the internal gear bracket 20 as shown in FIG. 13.

The press angle θ1 is an internal angle made by a vertical center line C3 and a tangent line C4 of the internal gear 22, at a contact point P9 of the pitch center line C1 of the external gear 12 and the pitch center line C2 of the internal gear 22.

In a reclining device, the press angle θ1 is generally at least 14.5°, but the press angle θ1 is in the range of 5° to 10° in the invention.

As in the present invention, when the press angle θ1 is small, the engagement strength of the external gear 12 and the internal gear 22 increases when a large load is applied in stop, such that pushing each other between the external gear bracket 10 and the internal gear bracket 20 is reduced.

Further, when the press angle θ1 is small, it is possible to obtain sufficient power from even a small-output motor in rotational operation, such that it is possible to achieve a compact reclining device.

The invention claimed is:

1. A reclining device of a seat for a vehicle comprising:
   a socket block 30 that has a socket protrusion 31 that is fitted on a shaft 1, which passes through the socket protrusion 31, and is inserted in a ring-shaped center protrusion 21 of an internal gear bracket 20 through a center hole 11 of an external gear bracket 10, and an operating protrusion 32 that covers a first portion of the outer circumference of the ring-shaped center protrusion 21;
   a connecting plate 33 that connects the socket protrusion 31 with the operating protrusion 32 and where a wedge spring 90 is attached and a spring protrusion 34 that protrudes from a side of the connecting plate 33 in the opposite direction to the socket protrusion 31 and fixes the wedge spring 90 attached to the connecting plate 33;
   a bearing 40 that is inserted in the center hole 11 of the external gear bracket 10; and
   a power transmission unit that is in close contact with the bearing 40 while covering a second portion of the outer circumference of the ring-shaped center protrusion 21, the second portion not covered by the operating protrusion 32, and rotates along the ring-shaped center protrusion 21 by a contact with the operating protrusion 32 when the shaft 1 rotates such that the external gear bracket 10 rotates with respect to the internal gear bracket 20.

2. The reclining device according to claim 1, wherein the power transmission unit
   is placed so that the operating protrusion 32 and the ring-shaped center protrusion 21 together cover an outer circumference; and further comprising:
   a pair of wedge blocks 70 that rotate along the ring-shaped center protrusion 21 which transmit power from the operating protrusion 32 when the shaft 1 rotates, and
   a cam 80 that is to be attached to the bearing 40 while being in contact with the outer sides of the pair of wedge blocks 70; wherein when the wedge blocks 70 are attached to the socket block 30, both ends of the pair of wedge blocks 70 are each fitted with the wedge spring 90 such that the wedge blocks 70 open in an outer direction during an operation of the reclining device.

3. The reclining device according to claim 2, wherein the pair of wedge blocks 70 is composed of a first wedge block 71 and a second wedge block 72 and each are formed in a quarter arc shape and each have an end that faces the end of the other wedge block, and
   the first and second wedge blocks 71, 72 have spring grooves 71a, 72a at first ends, the first ends facing each other to fit the wedge spring 90, and protrusion contact portions 71b, 72b at second ends, the second ends are bent outside to contact with the operating protrusion 32.

4. The reclining device according to claim 2, wherein the cam 80 is formed in a semicircular arc shape.

5. The reclining device according to claim 1, wherein a press angle ⊖1 between an external gear 12 of the external gear bracket 10 and an internal gear 22 of the internal gear bracket 20 that are engaged with each other is to be maintained in the range of 5° to 10°, wherein the press angle ⊖1 is an angle made by a vertical center line and a tangent line with respect to the internal gear 22 at a point of contact between a pitch center line of the internal gear 22 and a pitch center line of the external gear 12.

* * * * *